United States Patent [19]

Chung et al.

[11] 4,368,361
[45] Jan. 11, 1983

[54] AUTOMATICALLY ADJUSTABLE BIDIRECTIONAL-TO-UNIDIRECTIONAL TRANSMISSION NETWORK

[75] Inventors: Li-Jin W. Chung, Burlington, N.C.; Ernest P. Moore, Berkeley Heights, N.J.; Glendon R. Porter, Denville, N.J.; Joseph F. Rizzo, Lodi, N.J.

[73] Assignee: Bell Telephone Laboratories, Incorporated, Murray Hill, N.J.

[21] Appl. No.: 173,011

[22] Filed: Jul. 28, 1980

[51] Int. Cl.³ .............................................. H04B 3/20
[52] U.S. Cl. .............................. 179/170.2; 179/170 D
[58] Field of Search ....... 179/170 R, 170 D, 170 NC, 179/170.2, 170.6, 170.8

[56] References Cited

U.S. PATENT DOCUMENTS

| 3,982,080 | 9/1976 | Ukeiley | 179/170 D |
| 4,074,087 | 2/1978 | Blake et al. | 179/170.2 |
| 4,096,361 | 6/1978 | Crawford | 179/170 D |
| 4,096,362 | 6/1978 | Crawford | 179/170 D |
| 4,275,276 | 0/1978 | Rizzo | 179/170 D |
| 4,278,848 | 7/1981 | Rizzo et al. | 179/170 D |

*Primary Examiner*—Joseph A. Popek
*Attorney, Agent, or Firm*—Thomas Stafford

[57] ABSTRACT

"Transhybrid" loss is maximized in a transmission network of the active canceler type employed to couple receive and transmit unidirectional transmission paths to a bidirectional transmission path including 2-wire loaded type cable by controllably adjusting impedance elements of the canceler circuit in a prescribed sequence including adjustment of a network build out capacitor to obtain amplitude nulls of signals detected on the transmit path while supplying individual ones of a plurality of test signals to the receive path. The test signals include first and second signals having a plurality of equally spaced frequency components in first and second frequency bands, respectively, and a third signal having a predetermined single frequency. The adjustment sequence includes a plurality of iterative adjustments of predetermined impedance elements in predetermined groups until no changes in the impedance settings occur and multiple iterative adjustment of predetermined groups until no changes in the impedance settings occur. The impedance elements to be adjusted and the adjustment sequence are selected to rapidly converge the canceler circuit to an optimum transfer function for generating a correction signal which is substantially a replica of an error signal to be canceled from the transmit path.

11 Claims, 10 Drawing Figures

AUTOMATICALLY ADJUSTABLE BIDIRECTIONAL-TO-UNIDIRECTIONAL TRANSMISSION NETWORK

CROSS-REFERENCE TO RELATED APPLICATIONS

Our copending U.S. patent applications Ser. Nos. 173,020 and 173,014 were filed concurrently herewith.

TECHNICAL FIELD

This invention relates to transmission networks, and, more particularly, to circuit arrangements for automatically adjusting bidirectional-to-unidirectional transmission networks to maximize signal loss between a receive unidirectional path or facility and a transmit unidirectional path or facility.

BACKGROUND OF THE INVENTION

A number of arrangements are known in the art for coupling signals from a bidirectional transmission path or facility to receive and transmit unidirectional transmission paths or facilities. One example of this type transmission network is employed to couple a two-wire bidirectional telephone transmission facility to a four-wire telephone transmission facility.

As is now known, it is desirable to adjust a complex impedance circuit in the transmission coupling network in order to obtain a better match to the impedance of the bidirectional transmission path or facility, thereby maximizing loss between the receive and transmit unidirectional paths or facilities. This is commonly referred to as maximizing "transhybrid" loss.

Many transmission networks employ so-called hybrid networks to realize the desired bidirectional-to-unidirectional coupling. Transmission networks employing either hybrid transformers or electronic circuits are now commonly employed in telephone transmission systems for this purpose. In using either a hybrid transformer or an electronic "hybrid" it is desirable to employ a network having an impedance which substantially matches the impedance of the bidirectional transmission facility. Otherwise, low transhybrid loss results which, in turn, yields unwanted signal reflections. That is to say, a portion of the signal on the receive unidirectional path or facility appears in the transmit unidirectional path or facility. To this end, in transformer type hybrids, a complex impedance network is employed in an attempt at matching the impedance of the bidirectional path or facility. Similarly, in electronic canceler type "hybrids", a network having a complex transfer (impedance) characteristic is employed to generate a correction signal in attempting to cancel an unwanted error signal appearing as a component of the signal to be transmitted on the transmit unidirectional path or facility.

In either arrangement adjustable impedance networks have been used in order to obtain a better impedance match to the bidirectional facility and, hence, to maximize transhybrid loss.

In transmission networks which employ hybrid transformers, it has become the practice to employ an electronic network to generate a driving point impedance which emulates the complex impedance of the bidirectional transmission facility and, thereby, balance the hybrid transformer. Similarly, in transmission networks which employ canceler arrangements, an active impedance network is employed having a complex transfer characteristic which emulates the impedance characteristic of the bidirectional facility in order to generate the correction signal used for canceling the unwanted error signal in the transmit path or facility. A substantially fixed impedance canceler circuit is disclosed in U.S. Pat. No. 4,074,087 issued to R. B. Blake, Jr., et al., on Feb. 14, 1978.

In a copending application of J. F. Rizzo, Ser. No. 064,042, filed Aug. 6, 1979, now U.S. Pat. No. 4,275,276, issued June 23, 1981, an arrangement is disclosed for automatically adjusting impedance elements of an adjustable impedance network in an attempt at obtaining an optimum match to a particular bidirectional transmission facility. The arrangement employs individual tones, which are supplied to a receive port of a transmission network while corresponding individual impedance elements are adjusted until an amplitude null is detected at a transmit port of the transmission network. The tone signals are supplied and the amplitude adjustments are made in a prescribed sequence in order to obtain the best match to the impedance of the bidirectional facility. Then, a pseudo-random noise signal having predetermined frequency components across the entire voiceband is supplied to the receive port and one of the impedance elements is readjusted. The disclosed procedure rapidly yields an optimum match for a loaded bidirectional facility when adjusting an impedance network intended for use with hybrid transformer coupling arrangements.

However, when employing canceler type impedance circuits, it is extremely important to select the proper variables to adjust in order to obtain an optimum impedance match to the bidirectional facility and the proper adjustment sequence for converging the variables rapidly to the right settings for yielding the optimum match. We have learned from experimentation that the variables, adjustment sequence and signals employed cannot be arbitrarily chosen and still obtain the desired optimum result. Indeed, the wrong choice may result in adjustment of the canceler impedance to generate a transfer function which may not even closely match the bidirectional facility impedance. This would result in undesirable signal reflections.

Additionally, it is now desirable to include a network build out capacitor on the network side of the transmission network as distinguished from a line build out capacitor which is connected across terminals on the bidirectional facility side of the transmission network. Network build out capacitors are desirable because they can be electronically controlled and, therefore, easily adjusted. It is undesirable to include electronically controllable arrangements on the bidirectional facility side of the circuit because of their susceptibility to damage from voltage surges, e.g., lightning, and because of noise insertion in the facility.

Use of such adjustable capacitors makes it desirable to automatically adjust them in the impedance adjustment procedure. However, since the adjustment of the network build out capacitor does affect the impedance match of the bidirectional cable, such adjustment further complicates the adjustment of the transmission network impedance.

The adjustment procedure is further complicated for canceler type transmission networks intended to couple to loaded telephone 2-wire cable because of the use of 25 gauge 2-wire telephone cable commonly referred to as Metropolitan Area Trunk (MAT) cable.

SUMMARY OF THE INVENTION

"Transhybrid" loss is maximized in a transmission network of the canceler type for coupling receive and transmit unidirectional paths or facilities to a bidirectional path or facility of the loaded type, in accordance with an aspect of the invention, by controllably adjusting impedance elements of an adjustable impedance canceler circuit in the transmission network in a prescribed sequence including controllable adjustment of a network build out capacitor to obtain amplitude nulls of test signals in the transmit unidirectional path or facility when supplying individual ones of a plurality of the test signals via the receive unidirectional path or facility to the canceler. The test signals include at least a first test signal having a plurality of predetermined frequency components within a first predetermined frequency band, a second test signal having a plurality of predetermined frequency components in a second predetermined frequency band and a third test signal at a predetermined single frequency. The adjustment sequence includes a plurality of iterative adjustments of predetermined groups of the adjustable impedance elements until no change in the impedance adjustments of the elements in the individual groups occurs and multiple iterative adjustment of predetermined groups of the impedance elements until no change in the impedance adjustments of the elements occurs. Consequently, the canceler circuit impedances are rapidly adjusted to obtain a transfer function for generating a correction signal which is substantially a replica of an error signal developed because of the bidirectional path or facility impedance.

In accordance with another aspect of the invention, the impedance elements of the canceler circuit are adjusted in accordance with a first procedure employing the first, second and third test signals until the desired optimum adjustment is obtained. Then, a specific canceler impedance value is changed and a predetermined one of the other canceler impedance elements is readjusted to obtain an amplitude null with the first test signal being supplied. Then, a fourth test signal having a predetermined frequency is supplied via the receive path or facility, and the specific impedance value is changed back to its original value. The value of the specific impedance element for which the transhybrid signal detected in the transmit path or facility in response to the fourth test signal is the smallest is determined and is used to determine the type loaded path or facility being employed.

BRIEF DESCRIPTION OF THE DRAWING

The invention will be more fully understood from the following detailed description of an illustrative embodiment thereof taken in connection with the appended figures, in which.

DETAILED DESCRIPTION

Figure 1:
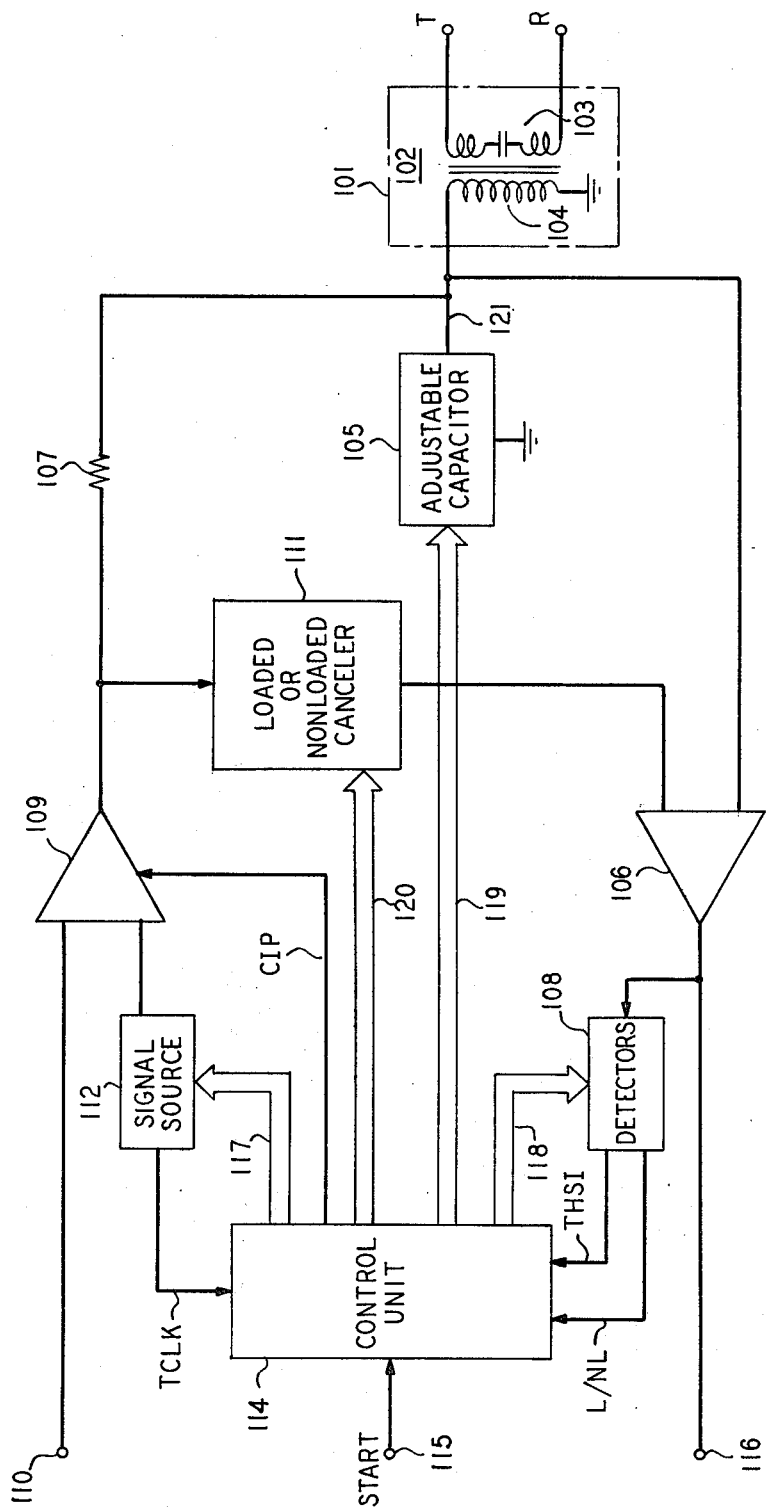
FIG. 1 shows in simplified block diagram form an automatically adjustable canceler type transmission network employing aspects of the invention to couple receive and transmit unidirectional transmission paths or facilities to a bidirectional transmission path or facility.

FIG. 1 shows in simplified form an automatically adjustable canceler type transmission network employed to couple receive and transmit unidirectional transmission paths or facilities to a bidirectional transmission path or facility. Such networks are intended for use in two- to four-wire transmission networks, two- to two-wire telephone repeaters, and similar coupling and repeater arrangements in widespread use in telephone transmission systems.

Canceler type transmission networks are employed to minimize unwanted signals appearing in the transmit path or facility because of the impedance of the bidirectional facility, coupling network and network build out capacitor. This minimization of the received signal appearing in the transmit path is commonly referred to as maximizing "transhybrid" loss in the coupling circuit. Since different lengths of bidirectional cable, as well as different cable gauges, are encountered in telecommunications systems, it is desirable that the transmission network be automatically adjustable to meet the various system needs with a minimum of human intervention and error. Additionally, with the inclusion of a controllably adjustable network build out capacitor, the automatic adjustment of the coupling network to maximize transhybrid loss is further complicated as indicated above. The automatically adjustable canceler type transmission network shown in FIG. 1 is intended to meet these various needs.

Accordingly, shown in FIG. 1 is coupling circuit 101 including transformer 102 having a first winding 103 and a second winding 104. Winding 103 is adapted to be connected via terminals T and R to a bidirectional transmission path or facility, for example, a two-wire telephone cable. Included in winding 103 is the usual midpoint capacitor employed in well-known fashion to extract signaling information. Winding 104 is adapted to be connected to receive and transmit unidirectional transmission paths or facilities. Although winding 104 is shown as being connected in single-ended configuration, it may equally be connected in a balanced configuration, as will be apparent to those skilled in the art. Transformer 102 may be any one of numerous coupling transformers known in the art and, preferably, has a 1:1 turns ratio.

In this example, a first terminal of winding 104 is connected to a reference potential point, for example, ground potential, while a second terminal of winding 104 is connected to adjustable capacitor 105, one input of gain unit 106 and one terminal of resistor 107. The output of gain unit 106 is adapted to be connected via terminal 116 to a transmit unidirectional path or facility and is connected to detectors 108. Similarly, one input of gain unit 109 is adapted to be connected via terminal 110 to a receive unidirectional path or facility. The output of gain unit 109 is connected to a second terminal of resistor 107 and to one input of canceler circuit 111. An output from canceler circuit 111 is connected to a second input of gain unit 106. An output of test signal source 112 is connected to a second input of gain unit 109.

Control unit 114 generates signals for controlling operation of the transmission network, in accordance with aspects of the invention, to automatically adjust capacitor 105 and canceler 111 for maximizing the transhybrid loss between receive terminal 110 and transmit terminal 116 when a bidirectional transmission path or facility is connected to terminals T and R. To this end, control signals are extended from control unit 114 via paths 119 to adjustable capacitor 105, via paths 118 to detectors 108, via paths 117 to signal source 112, via paths 120 to loaded or nonloaded canceler 111 and via path CIP to gain unit 109. Outputs L/NL and THSI from detectors 108 and output TCLK from signal source 112 are supplied to control unit 114. A signal for initiating operation of control circuit 114 is supplied as desired either automatically or manually via start terminal 115. Consequently, the capacitance value of adjustable capacitor 105 and the impedance function, i.e., transfer function, of canceler 111 are automatically adjusted as desired. Thus, the circuit automatically adjusts to compensate for changing network and/or bidirectional path or facility characteristics.

Signal source 112 under control of signals from control unit 114 supplies any of a plurality of test signals to a second input to gain unit 109, and hence, to the receive path or facility. Signal source 112 may be any of the numerous arrangements known in the art capable of controllably supplying the desired test signals. In this example, not to be construed as limiting the scope of the invention, signal source 112 is capable of generating a plurality of single frequency signals having predetermined amplitudes at 350 Hz, 1400 Hz, 2800 Hz, 3400 Hz, and 4000 Hz, and pseudo-random noise signals in first and second predetermined frequency bands, namely, ERL, having a plurality of equally spaced frequency components, for example, 100 Hz spacing in a band from 800 Hz to 2000 Hz and SRL-HI also having plurality of equally spaced frequency components, for example, 100 Hz spacing in a band from 2200 Hz to 4000 Hz.

It should be noted that the 1400 Hz, 2800 Hz and 3400 Hz signals are not used in adjusting the loaded canceler circuit to be described herein. The 1400 Hz and 2800 Hz are used to adjust a nonloaded canceler as described in our copending application, Ser. No. 173,014, while the 3400 Hz signal is used in the cable type identification arrangement described in our copending application, Ser. No. 173,020, both filed concurrently herewith.

As described in the copending application Ser. No. 064,042, a pseudo-random noise signal having frequency components across the entire voiceband was used to avoid adjusting the impedance network on a possible impedance peak or valley. In this embodiment of the invention, two distinct bands of pseudo-random noise are employed. It is important to restrict the ERL and SRL-HI pseudo-random noise signals to their respective frequency bands because use of signals outside the bands would result in erroneous adjustment of the corresponding impedance elements. That is to say, the impedance elements would be adjusted to less than optimum values.

Gain units 106 and 109 are substantially unidirectional amplifiers of the differential type commonly referred to as operational amplifiers now well known in the art. Gain unit 109 also includes a switching arrangement to disconnect the receive path during operation of the invention. This is effected via signal CIP from control unit 114.

Figure 2:
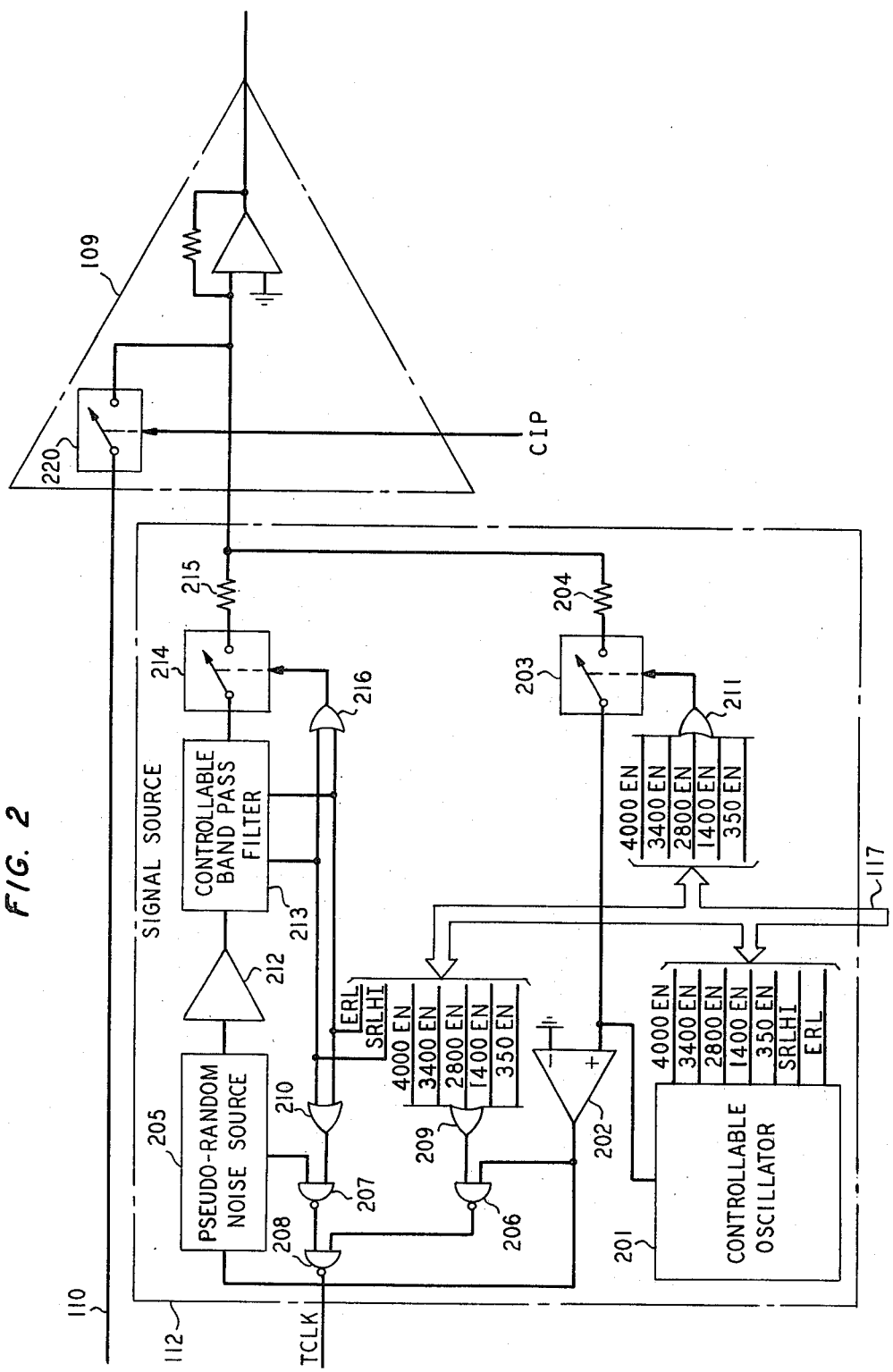
FIG. 2 depicts in simplified form details of the signal source and receive gain unit employed in the network of FIG. 1.

FIG. 2 shows in simplified form details of signal source 112 and its circuit relationship with gain unit 109 for insertion of the test signals into the receive path or facility. Accordingly, source 112 includes controllable oscillator 201 which is responsive to control signals supplied via paths 117 from control unit 114 for generating any one of a plurality of test signals. Specifically, oscillator 201 is responsive to control signals 350EN, 1400EN, 2800EN, 3400EN, 4000EN, ERL and SRL-HI to generate signals having frequencies of 350 Hz, 1400 Hz, 2800 Hz, 3400 Hz, 4000 Hz, 10,000 Hz, and 10,000 Hz, respectively. Any one of the numerous controllable oscillators known in the art may be employed for this purpose. The output of oscillator 201 is supplied to comparator 202 and via switch 203 and resistor 204 to an input of gain unit 109. Switch 203 is enabled via OR gate 211 when any of control signals 350EN, 1400EN, 2800EN, 3400EN or 4000EN is present, and the corresponding single frequency test signals are being generated and therefore being supplied by gain unit 109 into the receive path. Comparator 202 is employed to convert the output of oscillator 201 to a square-wave signal. An output of comparator 202 is supplied to pseudo-random noise source 205 and one input of NAND gate 206. Pseudo-random noise source 205 generates a pseudo-random noise signal having a plurality of frequency components at a predetermined frequency spacing. The pseudo-random noise signal is supplied via buffer amplifier 212, controllable bandpass filter 213, switch 214 and resistor 215 to an input of gain unit 109. Switch 214 is enabled or disabled via OR gate 216 when either ERL or SRL-HI are present or absent to supply or inhibit the pseudo-random noise signal to or from gain unit 109, respectively. In an example from experimental practice, a signal is generated in response to the 10 KHz square wave having a pseudo-random sequence of pulses which repeat every 10 milliseconds. The signal has a spectrum of equal amplitude components separated by 100 Hz. It is noted that other frequency spacings may equally be employed in the pseudo-random noise signal. To this end, source 205 includes a shift register and exclusive NOR gate (not shown) and a NOR gate (not shown) for generating a signal which is supplied to one input of NAND gate 207. NAND gates 206, 207 and 208 are employed to generate signal TCLK which is a pulse signal having a frequency equal to the tone signal being supplied to gain unit 109. For pseudo-random noise signals ERL and SRL-HI, signal TCLK is a 100 microsecond pulse signal generated at the beginning of each noise signal cycle. TCLK is supplied to control unit 114 where it is used for timing synchronization. OR gate 209 is employed to enable NAND gate 206 only when control signals 350EN, 1400EN, 2800EN, 3400EN or 4000EN are present. Otherwise, NAND gate 206 is disabled. Similarly, OR gate 210 is used to enable NAND gate 207 only when either ERL or SRL-HI are present. Controllable bandpass filter 213 is employed to limit the frequency components of the pseudo-random noise signal to the first and second predetermined frequency bands, namely, the ERL band which, in this example, is 800 Hz to 2000 Hz, or the SRL-HI band which, in this example, is 2200 Hz to 4000 Hz. Control signal CIP is employed to disable or enable switch 220, thereby cutting or connecting, respectively, the receive unidirectional path or facility.

Figure 3:
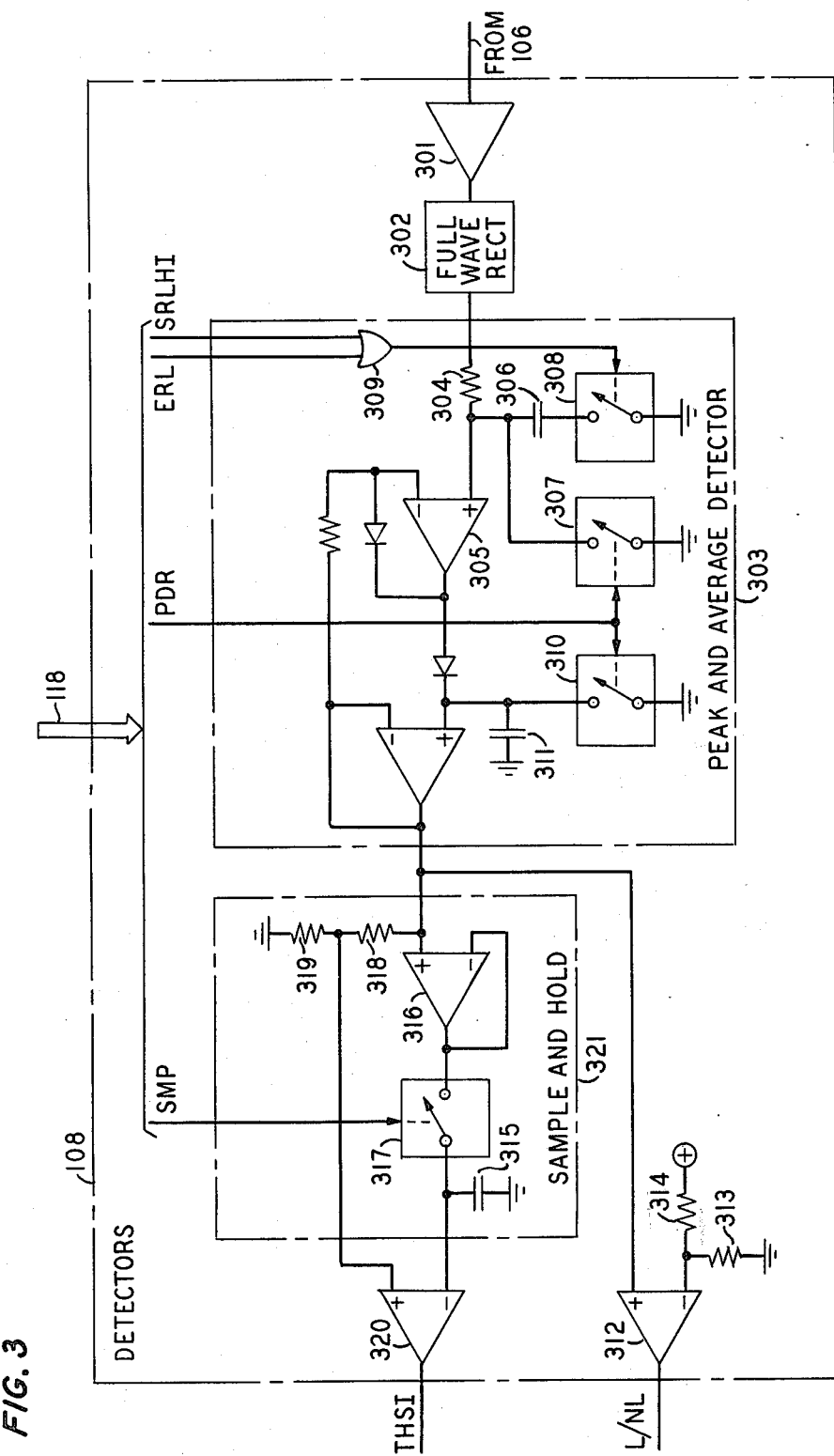
FIG. 3 shows details of the detectors employed in the network of FIG. 1.

FIG. 3 shows in simplified form details of detectors 108. A signal developed at the output of gain unit 106 is supplied via buffer amplifier 301 to full wave rectifier 302. In turn, the full wave rectified output from rectifier 302 is supplied to peak and average detector 303. To this end, the full wave rectified signal is supplied via resistor 304 to one input of amplifier 305, averaging capacitor 306 and one terminal of controllable switch 307. Averaging capacitor 306 is controllably connected in circuit between the first input of amplifier 305 and ground potential by switch 308 in response to an output from OR gate 309 when either ERL or SRL-HI are present. Connection of capacitor 306 in circuit converts detector 303 to an averaging detector. When capacitor 306 is out of circuit, detector 303 is a peak detector, as will be apparent to those skilled in the art. Switches 307 and 310 are employed to connect a shunt to ground potential across averaging capacitor 306 and across peak capacitor 311, respectively, in response to control signal PDR when detector 303 is re-set to an initial condition. An output from peak and average detector 303 is supplied to an input of L/NL detector comparator 312 and to an input of sample and hold 321. Comparator 312 is employed to compare the peak output of detector 303 with a predetermined threshold established by the voltage divider formed by resistors 313 and 314 to determine whether the bidirectional path or facility connected to terminals T and R (FIG. 1) is a loaded type cable or a nonloaded type cable. Output L/NL is supplied to control unit 114 where it is employed to control connection of an appropriate circuit in canceler 111 and to effect the automatic adjustment process corresponding to that canceler circuit. Operation of this identification function is further described in our co-pending application, Ser. No. 173,020, filed even date herewith. The output from detector 303 is controllably supplied to holding capacitor 315 via buffer amplifier 316 and controllable switch 317. Switch 317 is controlled via control signal SMP from control unit 114. A signal developed at the junction of resistors 318 and 319 is supplied to a first input of comparator 320 while a signal developed across capacitor 315 is supplied to a second input of comparator 320. Resistors 318 and 319 form a voltage divider in which the resistance value of resistor 319 is approximately 40 times than the resistance value of resistor 318. This establishes a prescribed detection threshold for determining whether the output of peak and average detector 303 is greater than the output from sample and hold 321. Comparator 320 yields an indication of whether the presently detected peak or average value from peak and average detector 303 is larger or smaller than the last sampled value stored on capacitor 315. An output from comparator 320 designated THSI is supplied to control unit 114 (FIG. 1). The signal developed at output THSI is limited either to a positive potential representative of a logical "1" or to substantially zero potential representative of a logical "0". The logical "1" THSI output indicates that the presently detected peak or average value from detector 303 is greater than the last sampled peak or average value stored on capacitor 315. Conversely, the logical "0" output indicates that the presently detected peak or average value from detector 303 is less than the last sampled peak or average value stored on capacitor 315. Control signal PDR controls resetting of peak and average detector 303 to an initial condition while control signal SMP controls sampling of the output from detector 303.

Figure 4:
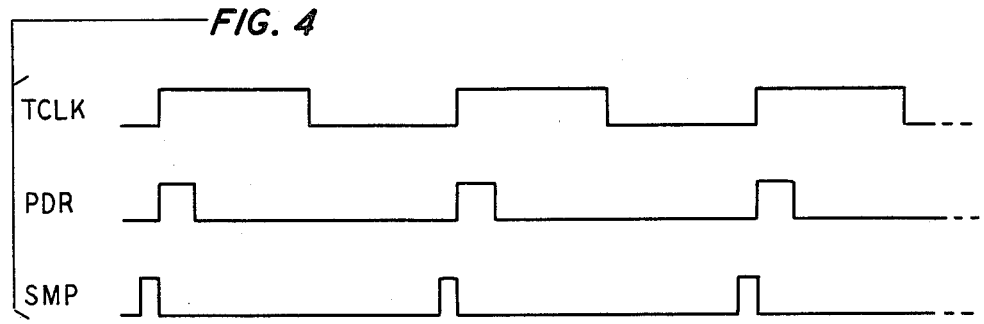
FIG. 4 depicts a sequence of waveforms useful in describing the operation of the detectors illustrated in FIG. 3.

FIG. 4 is a timing diagram illustrating the peak and average detecting, sampling and interrogating process. Signals PDR and SMP are generated by control unit 114 (FIG. 1) in prescribed relationship to signal TCLK from tone source 112 (FIG. 1). Similarly, output THSI from comparator 320 is interrogated by control logic 114 just before the output from detector 303 is again sampled. That is, THSI is sampled just prior to generation of SMP. Signal TCLK is a pulse signal having the same frequency as the individual tone signal being generated by source 112. When the pseudo-random noise signals are being generated, TCLK is a pulse signal of approximately 100 microseconds duration occurring at the beginning of each 10 millisecond pseudo-random noise signal cycle.

Figure 5:
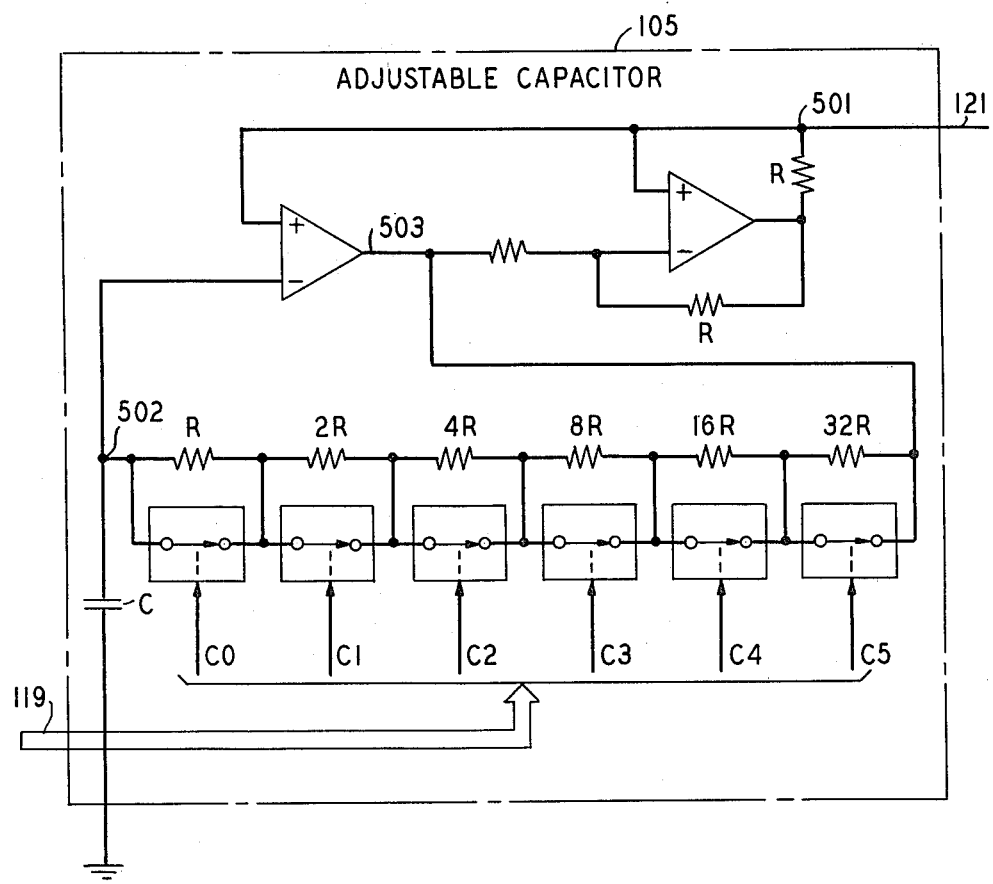
FIG. 5 illustrates details of the adjustable capacitor employed in the network of FIG. 1.

FIG. 5 shows details of adjustable capacitor 105. Essentially, circuit 105 is a capacitance multiplier wherein the effective capacitance value developed between output 501 and ground potential is proportional to the value of capacitor C multiplied by the sum of the resistance values connected between circuit points 502 and 503 divided by R. The resistors connected between circuit points 502 and 503 are all proportional to R as shown. The connection of the resistors between points 502 and 503 is controlled by control signals C0 through C5 and the corresponding switches in a manner which will be apparent to those skilled in the art. The switches are normally closed shunting the corresponding resistors. Control signals C0 through C5 are supplied via paths 119 from control unit 114. The capacitance is controllable in this example from 0 microfarads to 0.128 microfarads. In an example from experimental practice, the nominal value of the capacitance is approximately 0.048 microfarads for other than MAT cable. For MAT cable the nominal capacitance value is approximately 0.036 microfarads.

Figure 6:
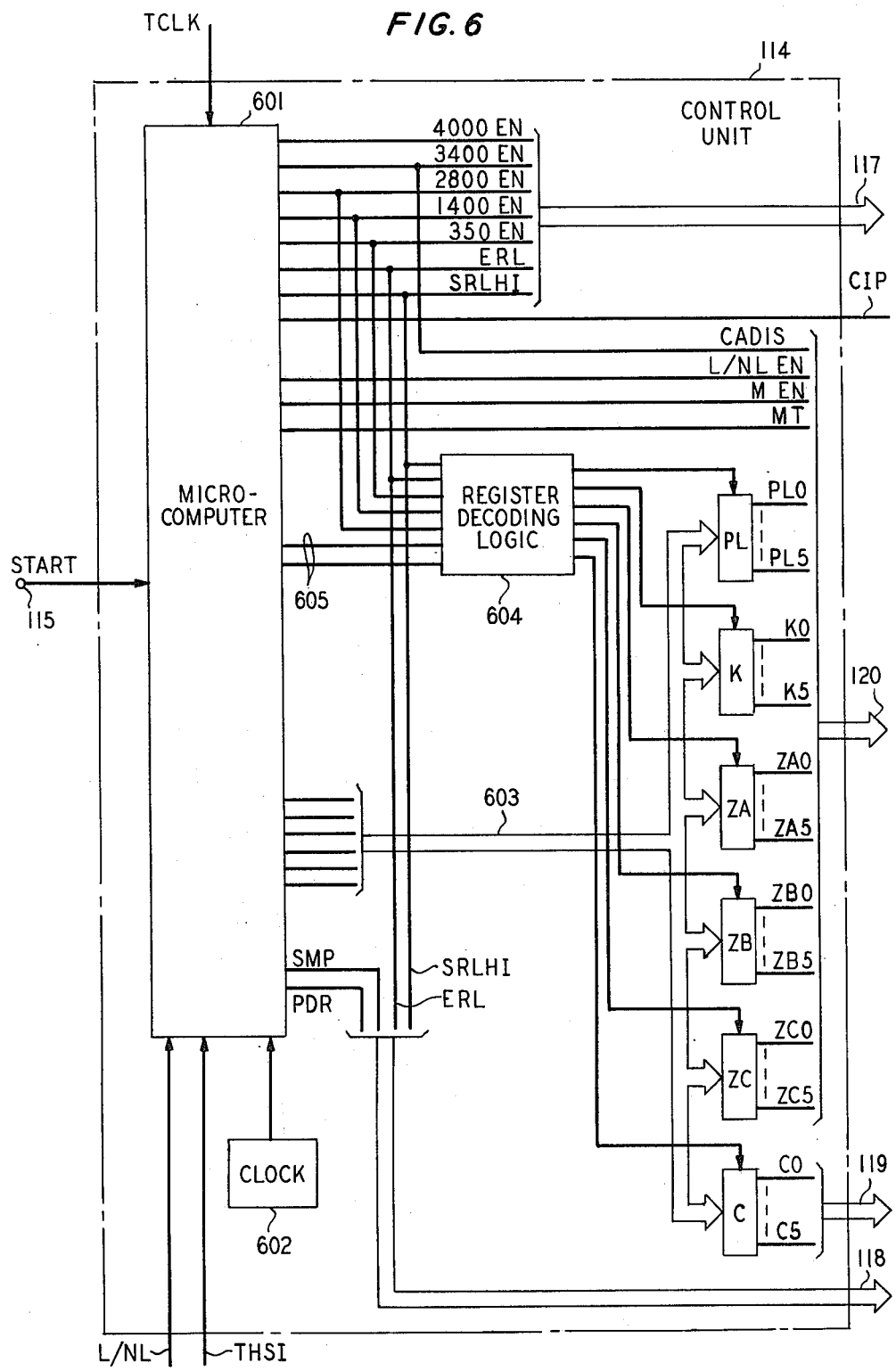
FIG. 6 shows in simplified form details of the control unit employed in the network of FIG. 1.

FIG. 6 shows in simplified form details of control unit 114. Control unit 114 includes microcomputer 601, which may be any of the microcomputer systems including a CPU, RAM, ROM and an I/O unit now known in the art. Additionally, microcomputer 601 includes a plurality of working registers which are employed in the process of generating control signals for controlling operation of an embodiment of the invention. Programs for controlling generation of the desired control signals are stored in the ROM of microcomputer 601. Preferably, microcomputer 601 is an Intel 8748 commercially available. Details and programming of the Intel 8748 are described in "Intel MSC-48 Family of Single Chip Microcomputers-Users Manual," dated 1978. A timing signal for microcomputer 601 is obtained from clock circuit 602. Registers PL, K, ZA, ZB and ZC, and register C are employed to store digital signals representative of settings of impedance elements in canceler 111 and adjustable capacitor 105, respectively. The digital signals representative of the impedance settings are supplied to the corresponding registers from microcomputer 601 via paths 603. The appropriate one of the registers in which the digital signals are to be stored is enabled via a corresponding control signal from register decoding logic 604. Register decoding logic 604 is supplied with a code from microcomputer 601 via path 605 and is supplied with control signals 350EN, 1400EN, 2800EN, ERL and SRL-HI for determining which one of the registers is to be enabled for storing the digital signals representative of an impedance setting currently being supplied on paths 603 from microcomputer 601. Microcomputer 601 generates control signals, namely, 4000EN, 3400EN, 1400EN, 2800EN, 350EN, ERL, SRL-HI, CIP, CA DIS, L/NL EN, MT, MEN, SMP and PDR. Control signals 4000EN, 3400EN, 1400EN, 2800EN, 350EN, ERL and SRL-HI are supplied via leads 117 to control operation of signal source 112. In turn, signal source 112 supplies TCLK to microcomputer 601. Control signal CIP is supplied to gain unit 109 to control connection of the receive path or facility. Control signals ERL, SRL-HI, SMP and PDR are supplied via leads 118 to control operation of detectors 108. In turn, detectors 108 supply signals L/NL and TSHI to microcomputer 601. Similarly, impedance setting signals C0-C5 are supplied via leads 119 to control adjustable capacitor 105. Control signals CA DIS, L/NL EN, MT, MEN, PL0-PL5, K0-K5, ZA0-ZA5, ZB0-ZB5 and ZC0-ZC5 are supplied via leads 120 to canceler 111 where they are employed to control insertion and adjustment of the canceler circuit. Control signals PL0-PL5, K0-K5, ZA0-ZA5, ZB0-ZB5, ZL0-ZL5, and C0-C5 are digital signals for controlling corresponding analog switching elements to adjust the associated impedance elements to desired impedance values.

Figure 7:
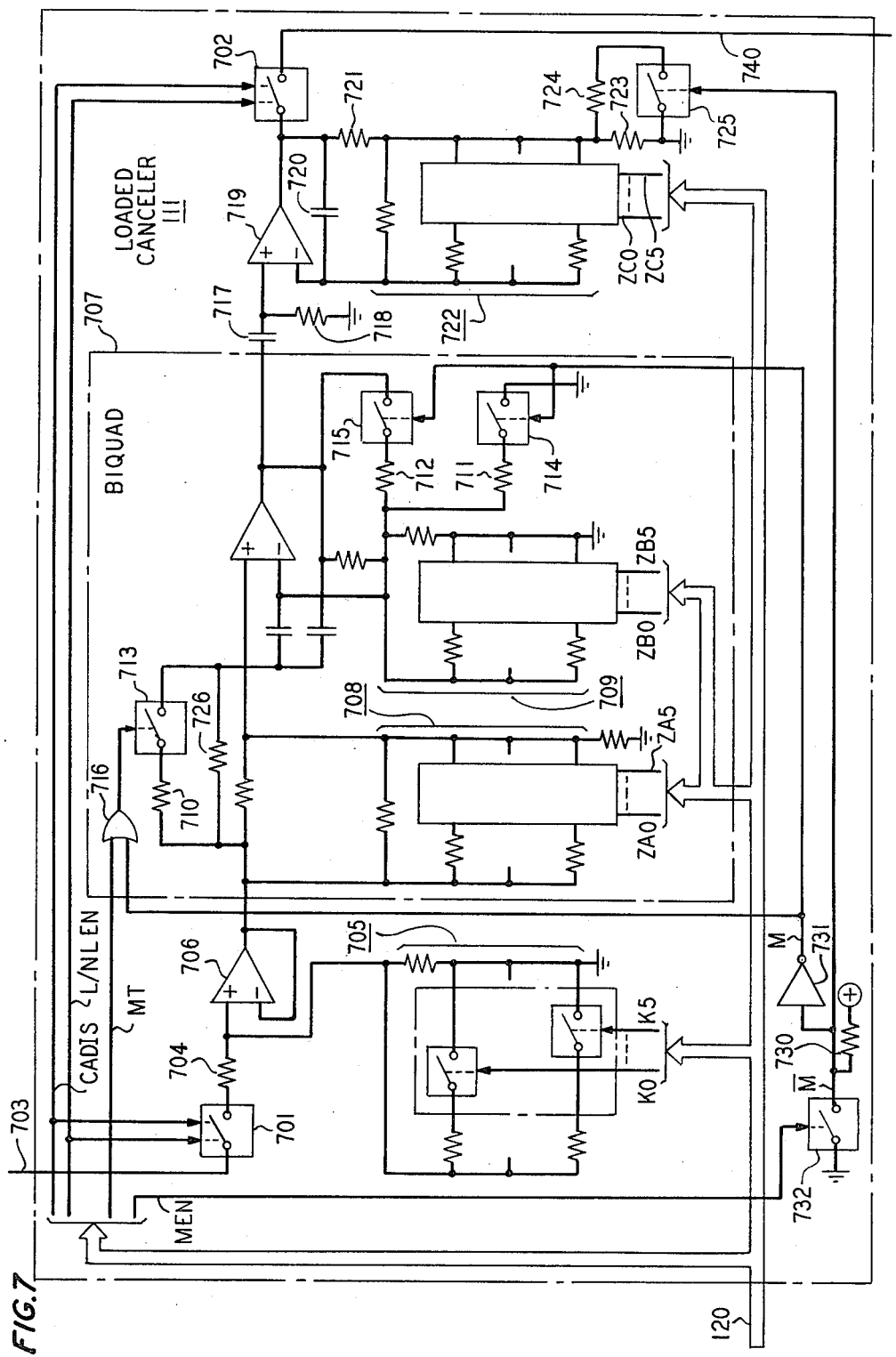
FIG. 7 illustrates in simplified form details of one loaded type canceler circuit used in the network of FIG. 1.

FIG. 7 shows details of one canceler circuit which may be employed in canceler 111 that is intended for use with various lengths and gauges of loaded 2-wire telephone cable. Transfer function G(s) realized by the circuit of FIG. 7 has been chosen so that canceler 111 generates in response to a signal from gain unit 109, i.e., the received signal, a correction signal which is substantially a replica of an error signal developed across winding 104 of coupling circuit 101 (FIG. 1). The correction signal is supplied to an input of gain unit 106 where it is algebraically combined with the transmit signal including the error signal developed across winding 104, thereby yielding an output from gain unit 106 which is substantially free of the error signal.

To this end, canceler 111 has transfer function $$G(s) = K \frac{s(s + z2)(s^2 + 2a\omega_z s + \omega_z^2)}{(s + p1)(s + p2)(s^2 + 2b\omega_p s + \omega_p^2)} \quad (1)$$

which is essentially identical to the transfer function described in relation to the canceler circuit in U.S. Pat. No. 4,074,087 noted above. In the prior canceler circuit the circuit was manually set up for different cable gauges and certain of the impedance elements were adjusted when the cable was 25 gauge loaded cable known as Metropolitan Area Trunk (MAT). However, the prior canceler arrangement was not employed with an automatically adjustable network build out capacitor nor was it automatically adjustable to match different cable lengths and gauges. Indeed, we have determined that both the choice of impedance elements to be adjusted and the adjustment sequence is critical to whether or not a rapid convergence to the right impedance adjustment (transfer function) is obtainable. Apparently, a choice of a wrong adjustment sequence and/or a wrong combination of impedance elements to be adjusted in the canceler results in adjustment of the transfer function so that the canceler does not generate the desired correction signal. Consequently, the error signal is not canceled and appears in the signal being transmitted.

To this end, canceler 111 includes controllable switching elements 701 and 702 for controllably connecting and disconnecting canceler 111 in circuit between the output of gain unit 109 and an input of gain unit 106. Specifically, switching elements 701 and 702 are responsive to control signal L/NL for inserting an appropriate canceler 111 in circuit for loaded or non-loaded cable applications, and to CA DIS for disabling canceler 111, i.e., taking it out of circuit when the type facility identification process described in our copending application, Ser. No. 173,020, is enabled. The non-loaded canceler circuit is described in our copending application, Ser. No. 173,014. In this example, loaded cable is assumed.

Accordingly, signals are supplied from gain unit 109 via terminal 703 and switch 701 to a controllable voltage divider including resistor 704 and controllably adjustable resistor 705 where the signal is amplitude scaled (K). Adjustable resistor 705 in response to control signals K0-K5 from control unit 114, adjusts the amplitude scaling (K) in the adjustment process described below. The scaled signal is supplied via buffer amplifier 706 to biquad 707.

Biquad 707 is a single amplifier active RC filter and is employed to realize the quadratic pole-zero pairs of equation (1), namely, $$\frac{(s^2 + 2a\omega_z s + \omega_z^2)}{(s^2 + 2b\omega_p s + \omega_p^2)} \quad (2)$$

Resistors 708 and 709 are adjustable in response to control signals ZA0-ZA5 and ZB0-ZB5, respectively, from control unit 114 to accommodate different lengths and gauges of cable and are adjusted in accordance with the adjustment process described below. Specifically, ZA (708) and ZB (709) are adjusted to peak or roll-off the high frequency end of the transfer function of canceler 111 to match the particular loaded cable connected to T and R and the particular setting of adjustable capacitor 105. Resistors 710, 711 and 712 are controllably connected in the biquad circuit via switching elements 713, 714 and 715, respectively, in response to signal M to change the frequency response of biquad 707 when MAT cable is employed as described in U.S. Pat. No. 4,074,087 noted above. Moreover, the biquad must be adjusted to peak or roll-off the canceler transfer function to best match the cable impedance. This is further complicated because of the use of adjustable network build out capacitor 105 in place of the prior fixed line build out capacitor. Additionally, resistor 710 is controllably connected in and out of circuit via switch 713 in response to control signal MT via OR gate 716 during a test to determine, in accordance with an aspect of the invention, whether the bidirectional path or facility connected to T and R (FIG. 1) is MAT cable as described below.

An output from biquad 707 is supplied to capacitor 717 which in combination with resistor 718 generate $$\frac{s}{(s+p1)} \qquad (3)$$

Although pole p1 is shown as occurring at a fixed frequency in this example, it will be apparent that pole p1 can be adjustable for compensating the transfer characteristic in the low frequency range.

In turn, a signal from capacitor 717 is supplied to a noninverting input of amplifier 719. Included in a feedback path between an output and inverting input of amplifier 719 is capacitor 720, resistor 721 and adjustable resistor 722. Resistors 723 and 724 are connected between the junction of resistors 721 and 722 to nominally realize the function $$\frac{s+z2}{s+p2} \qquad (4)$$

In this example pole p2 is directly proportional to zero z2. Switch 725 responds to control signal M to normally connect resistor 724 in parallel with resistor 723. When MAT cable is employed, resistor 724 is disconnected. Resistor 722 responds to control signals ZC0-ZC5 from control unit 114 to adjust the transfer function primarily in the midfrequency range for different cable lengths. ZC (722) is also adjusted in the low frequency range as described below. An output from amplifier 719 is the desired correction signal, i.e., a replica of the error signal component developed across winding 104 (FIG. 1). The correction signal is supplied via switching element 702 and circuit path 740 to gain unit 106.

Control signals M and M̄ are generated by employing resistor 730, inverter 731 and controllable switch 732. Switch 732 is enabled and disabled in response to control signal MEN from control unit 114. When switch 732 is disabled, M is a high representative of a logical 1 and M̄ is a low representative of a logical 0. When switch 732 is enabled, M is 0 and M̄ is 1.

Operation of control unit 114 in generating control signals for adjusting the impedance elements of canceler 111 and adjustable capacitor 105, in accordance with aspects of the invention, is described below in conjunction with digital program flow chart shown in FIGS. 8 through 10. The programs described in the flow charts may be readily reduced to a program listing in assembly language for the Intel 8748 microcomputer system to describe a set of electrical control signals that serve to configure control unit 114 into a machine capable of generating control signals for controlling an embodiment of the invention for adjusting impedance elements of canceler 111 and of adjustable capacitor 105.

Figure 8:
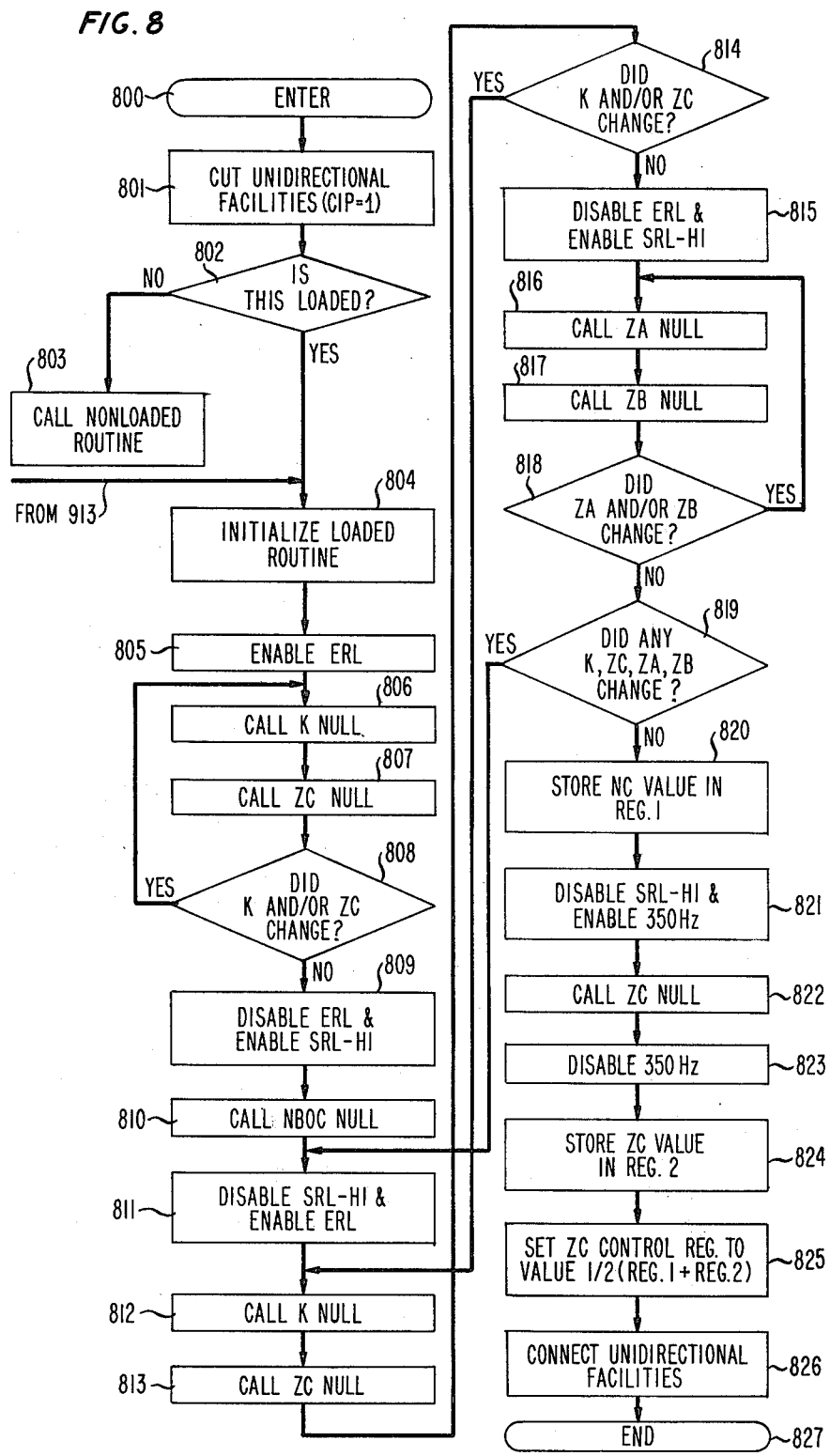
FIG. 8 is a flow chart of a program routine illustrating a sequence of steps employed in one embodiment of the invention for adjusting the adjustable capacitor and impedance elements of the canceler circuit used in the network of FIG. 1 in accordance with aspects of the invention to maximize the so-called "transhybrid" loss between the receive path or facility and the transmit path of facility.

FIG. 8 shows a flow chart of a program routine for controlling the embodiment of the invention shown in FIG. 1 to maximize automatically the so-called "transhybrid" loss between the receive path or facility and the transmit path or facility primarily for loaded type 2-wire telephone cable connected to terminals T and R.

Accordingly, the routine is entered via oval 800. Operational block 801 causes CIP=1 to be generated to open circuit the receive path. In practice, the transmit path would also be open circuited or otherwise terminated.

Conditional branch point 802 tests to determine whether the cable is loaded or nonloaded. This determination would have been made by a test described in our copending application, Ser. No. 173,020, filed even date herewith. If the test result is no, a nonloaded cable routine is called via block 803 as described in our copending application, Ser. No. 173,014, filed even date herewith. If the test result is yes, the cable is loaded and the loaded cable routine continues.

Operational block 804 causes the loaded routine to be initialized and registers K, ZA, ZB, and ZC to be set to a mid-value, in this example, of 32, and for register C to be set to an initial value, in this example of 24 for other than MAT cable. Upon determination that the cable is MAT type in accordance with the procedure shown in FIG. 9 and described below the initialization associated with operational block 913 (FIG. 9) includes setting registers C to 18. Register PL is not employed in the loaded cable routine.

Operational block 805 causes control ERL to be generated, thereby enabling the corresponding circuits in control unit 114, signal source 112 and detectors 108 to generate pseudo-random noise signal ERL and detect it.

Operational block 806 causes the null subroutine associated with adjusting impedance element K via K0-K5 (FIG. 7) in accordance with the null adjustment and detector subroutine shown in FIG. 10 and described below. Simply stated, impedance K is adjusted with ERL supplied to the receive path until a signal null is detected in the transmit path via detectors 108. This adjusts the midfrequency (ERL) range gain of canceler 111.

Operational block 807 causes the null subroutine associated with adjusting impedance element ZC via ZC0-ZC5 (FIG. 6) to be effected.

Conditional branch point 808 tests to determine if there was any change in the K or ZC register settings. If yes, steps 806 and 807 are iterated until no change is detected. When the test is no, control is transferred to operational block 809.

Steps 806-808 cause the iterative adjustment of canceler impedance elements K and ZC as a group to adjust the transfer function to match the cable impedance connected to T and R in the ERL or mid-frequency band.

Operational block 809 causes ERL to be disabled and SRL-HI to be enabled.

Operational block 810 causes the null subroutine associated with adjusting network build out capacitor elements C0-C5 of adjustable capacitor 105 (FIG. 5) to be effected. As indicated above, the value of capacitor 105 affects the high frequency end of the canceler transfer function to match the loaded cable. Actually, capacitor 105 affects the impedance developed across winding 104 (FIG. 1) which canceler 111 must match.

Operational block 811 causes SRL-HI to be disabled and ERL to be enabled.

Steps 812-814 cause the iterative adjustments of K and ZC as a group again until no changes in the impedance adjustments are detected. This readjusts the canceler transfer function to match the cable in the ERL frequency band.

Operational block 815 causes ERL to be disabled and SRL-HI to be enabled.

Operational block 816 causes the null subroutine associated with adjusting impedance element ZA via ZA0–ZA5 (FIG. 7) to be effected.

Similarly, operational block 817 causes the null subroutine associated with adjusting impedance element ZB via ZB0–ZB5 (FIG. 7) to be effected.

Conditional branch point 818 tests to determine if there was any change in the corresponding ZA and ZB register settings. If the test is yes, steps 816 and 817 are repeated until no change is detected. When the test is no, control is transferred to conditional branch point 819.

Steps 816–818 cause the iterative adjustment of ZA and ZB in a group for adjusting the transfer function of canceler 111 to match the impedance of the cable connected to T and R in the SRL-HI or high frequency band. Specifically, depending on the loaded cable end section being employed, the high frequency end of the transfer function is peaked or rolled-off. For example, if the length of the end section is less than 3 K feet, the transfer function is peaked, and if the length is greater than 3 K feet, the transfer function is rolled-off.

Conditional branch point 819 tests to determine whether the settings of registers K, ZC, ZA or ZB have changed. If the result is yes, control is returned to operational block 811 and steps 811–819 are repeated to adjust the K and ZC impedance group and ZA and ZB impedance group in a multi-iterative process, in accordance with an aspect of the invention, to rapidly converge elements K, ZC, ZA and ZB in the ERL and SRL-HI frequency bands to the specific loaded cable connected to T and R. The multi-iterative adjustment sequence is especially critical in order to converge to the correct settings of the corresponding impedance elements. Use of a different sequence will most likely converge to some setting but not one which maximizes the so-called transhybrid loss.

Operational block 820 causes the ZC register setting (813) to be stored in working register 1 in microcomputer 601.

Operational block 821 causes SRL-HI to be disabled and 350 Hz to be enabled.

Operational block 822 causes the null subroutine associated with adjusting ZC0–ZC5 to be effected. This causes impedance ZC to be adjusted to the loaded cable in the low frequency band.

Operational block 823 causes 350 Hz to be disabled.

Operational block 824 causes the last ZC register setting (822) to be stored in working register 2 of microcomputer 601.

Operational block 825 causes the ZC register to be set to a value equal to one-half (Register 1 + Register 2). This is necessary because of interaction of the ZC adjustment at 350 Hz with the ZC adjustment at ERL. Consequently, it has been determined that a compromise value equal to one-half the sum of both ZC settings is the best overall adjustment of the transfer function of canceler 111.

Operational block 826 causes the unidirectional receive path to be connected in gain unit 109. In practice, a similar connection would be effected in the output circuit of gain unit 106.

The process is exited via oval 827.

Thus, in summary, the adjustment sequence in accordance with an aspect of the invention is to first adjust the transfer function gain component K and impedance ZC of canceler 111 with signal ERL to match the transfer function in the mid-frequency band to the loaded cable. Then, network build out capacitor 105 is adjusted with SRL-HI to roll-off the high frequency end impedance of the cable. Since the capacitance adjustment affects the K and ZC adjustments, they are readjusted with signal ERL. Thereafter, biquad 707 impedances ZA and ZB are adjusted with signal SRL-HI to peak or roll-off the high frequency end of the canceler transfer function. Since there is interaction between the impedance adjustments, the K and ZC iteration and the ZA and ZB iteration are iterated until there is no change in any of the corresponding impedance settings. Then, ZC is adjusted with the single frequency 350 Hz signal to adjust the low frequency end of the canceler transfer function. Since this adjustment affects the ZC adjustment made with the ERL signal, a compromise between the two settings is used. This procedure results in a rapid convergence of the canceler transfer function including the network build out capacitor adjustment step to match the cable impedance developed across winding 104 including capacitor 105, thereby maximizing "transhybrid" loss between terminals 110 and 116 (FIG. 1). From experimentation, it has been determined that the network converges to an optimum setting in approximately 1 to 5 seconds.

Figure 9:
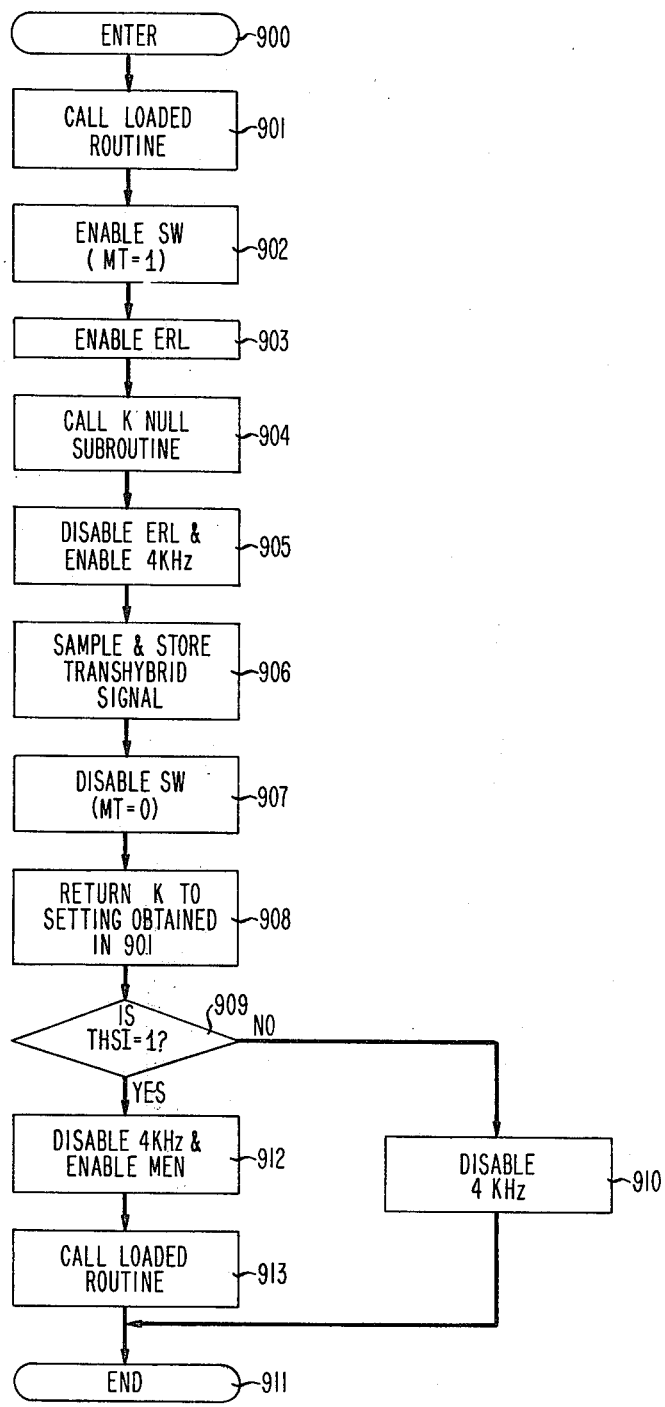
FIG. 9 is a flow chart of a program routine illustrating a sequence of steps employed in an embodiment of the invention for adjusting the adjustable capacitor and impedance elements of the canceler circuit and for determining in accordance with an aspect of the invention whether the type loaded telephone cable is of the so-called MAT type, and, if so, effecting a proper adjustment for MAT type cable.

FIG. 9 is a flow chart of a program routine for generating in control unit 114 control signals for automatically adjusting the network to maximize transhybrid loss and for determining whether the loaded cable is of the MAT type and, if so, adjusting canceler 111 and capacitor 105 accordingly.

The routine is entered via oval 900.

Operational block 901 causes the loaded routine of FIG. 8 to be effected.

Operational block 902 causes switch 713 (FIG. 7) to be enabled in response to control signal MT supplied via OR gate 716 (FIG. 7). This connects resistor 710 in parallel with resistor 726 to change the high frequency roll-off of biquad 707.

Operational block 903 causes ERL to be enabled.

Operational block 904 causes the null search subroutine associated with adjusting gain adjustment K to be effected. This readjusts the transfer function in the mid-frequency band.

Operational block 905 causes ERL to be disabled and 4000 Hz to be enabled. 4000 Hz is the upper end of the voice band and is used because the MAT cable frequency characteristic has a higher frequency roll-off than other loaded type cable.

Operational block 906 causes detectors 108 to sample and store the output from gain unit 106. This stored value corresponds to that with the impedance of biquad being varied by resistor 710 being inserted. Resistor 710 would also be inserted when biquad 707 is adjusted to correspond to MAT cable.

Operational block 907 causes switch 713 to be disabled, thereby returning biquad 707 to its normal condition.

Operational block 908 causes the setting of register K to be returned to that obtained in step 901. This returns the adjustment of canceler 111 to that obtained for loaded cable other than MAT. Consequently, the output from peak detector 303 is supplied to be compared with the value stored when resistor 710 was connected, i.e., when the impedance of biquad 707 corresponds in part to MAT cable.

Conditional branch point 909 tests to determine if THSI=1. If THSI is 1, the signal at the output of gain unit 106 when the canceler was adjusted for loaded cable other than MAT is greater than that stored when the impedance element of biquad was adjusted to that associated with MAT cable. Consequently, the cable is MAT type. If THSI is 0, the cable is other than MAT, and control is transferred to block 910.

Operational block 910 causes 4000 Hz to be disabled. Thereafter, the routine is exited via 911, and canceler 111 and capacitor 105 are adjusted to values obtained in step 901.

Returning to conditional branch point 909, if THSI=1, the cable is MAT and a yes result is obtained. Consequently, control is transferred to operational block 912.

Operational block 912 causes 4000 Hz to be disabled and MEN to be enabled. In turn, MEN causes M=1 and $\overline{M}$=0 (FIG. 7). This, in turn, adjusts the corresponding impedance elements of canceler 111 to those corresponding to MAT cable. MEN remains enabled until the cable is changed to other than MAT type.

Operational block 913 causes the loaded cable routine of FIG. 8 to be entered at operational block 804 and the routine to be initialized for MAT cable as described above in relation to operational block 804.

Thereafter, the routine is exited via oval 911.

The use of the process of FIG. 9 provides a rapid determination, in accordance with an aspect of the invention, of whether or not the cable connected to terminals T and R is MAT type without the need of first adjusting all the impedance elements of canceler 111 for both the usual loaded type and then for MAT type.

Figure 10:
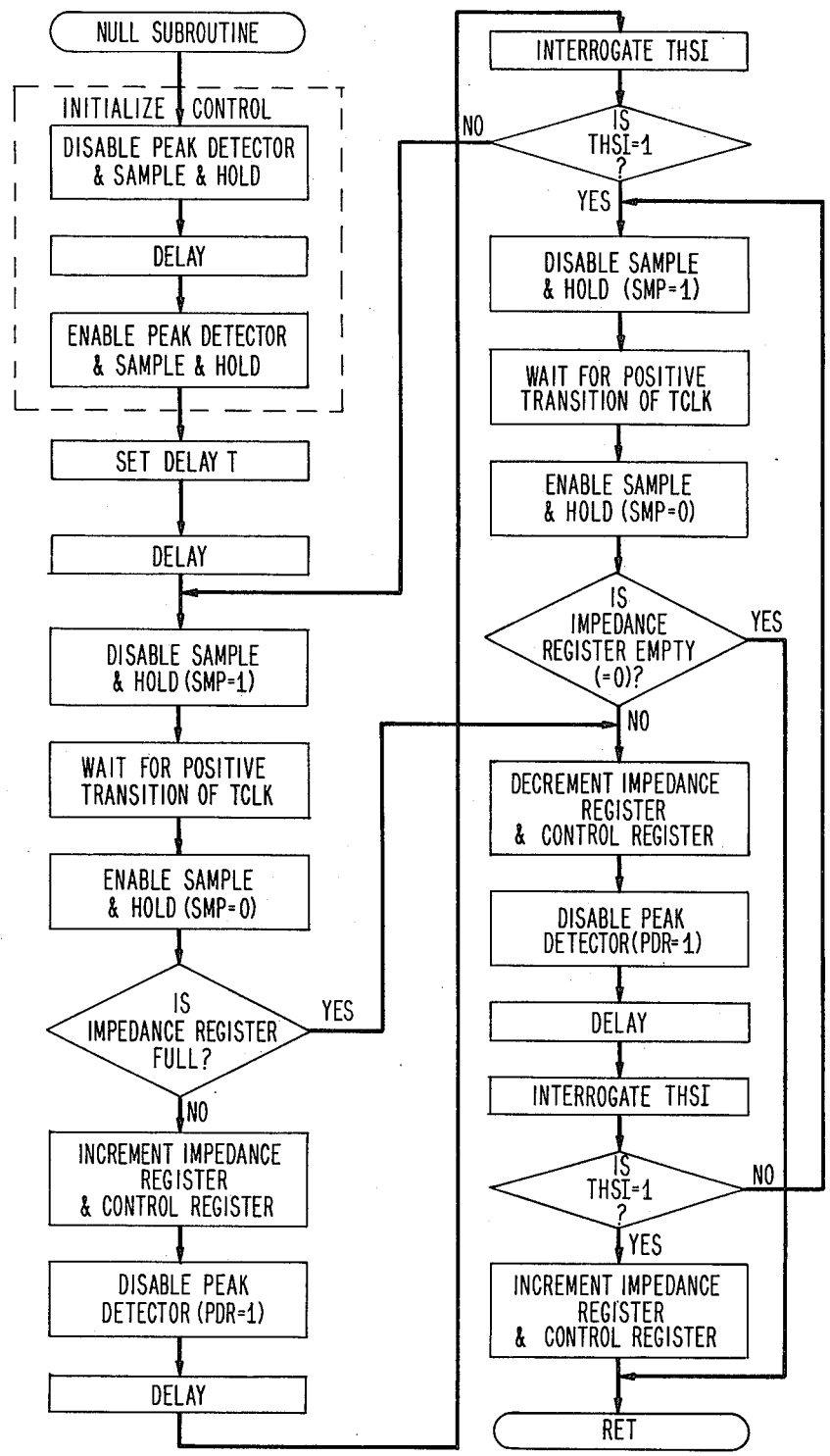
FIG. 10 is a flow chart of the amplitude null search subroutine employed in the adjustment of the adjustable capacitor and impedance elements in the canceler circuit employed in the network of FIG. 1.

FIG. 10 shows a flow chart of the adjustable impedance and amplitude null search program subroutine employed in the loaded facility adjustment routines shown in FIGS. 8 and 9. The null search routine first steps the corresponding impedance adjustment in a predetermined direction until a first increase is detected in the amplitude of the signal at the output of gain unit 106. Then, the impedance adjustment is stepped in a direction opposite to the first direction until a second increase is detected in the amplitude of the signal at the output of gain unit 106. Thereafter, the impedance adjustment is stepped one step in the first direction to obtain the desired amplitude null. This procedure simplifies the search routine.

The adjustment and null search routine of FIG. 10 is essentially identical to that disclosed in the copending application of J. F. Rizzo, Ser. No. 064,042 (now U.S. Pat. No. 4,275,276, issued June 23, 1981), noted above. However, in this routine the initialization of detectors 108 is included in the adjustment and amplitude null search routine.

We claim:

1. A transmission network adapted to couple a unidirectional receive path and a unidirectional transmit path to a bidirectional path including a 2-wire cable comprising:

a canceler including means for generating a correction signal which is substantially a replica of an error signal developed in the network and included as a component of a transmit signal supplied to the transmit path, said correction signal generating means including a plurality of controllably adjustable impedance elements;

controllable signal generating means for supplying predetermined test signals to the receive path;

signal detection means for detecting signal amplitudes on the transmit path;

means for algebraically combining said correction signal with the transmit signal; and control means for generating control signals to controllably adjust said plurality of impedance elements in said correction signal generating means in a prescribed adjustment sequence, each of said impedance elements being adjusted in said sequence while supplying a corresponding one of said test signals to the receive path to obtain an amplitude null in the transmission path as detected by said detection means, said adjustment sequence including multiple iterative adjustment of predetermined ones of said impedance elements for automatically converging said correction signal generation means to have an optimum transfer function which substantially matches the impedance developed in the network when the bidirectional path is connected thereto so that said correction signal is substantially a replica of the error signal.

2. A transmission network as defined in claim 1 wherein said adjustment sequence includes iterative adjustment of predetermined ones of said impedance elements in predetermined groups and multiple iterative adjustment of said groups of impedance elements until no change in the impedance adjustments occur.

3. A transmission network as defined in claim 2 in which said 2-wire cable is of the loaded type, which further includes a controllably adjustable network build out capacitor, and wherein said control means generates control signals for adjusting said network build out capacitor in said prescribed sequence while supplying a predetermined one of said test signals to the receive path.

4. A transmission network as defined in claim 3 wherein said test signals including a first signal having a plurality of equally spaced frequency components in a first predetermined frequency band, a second signal having a plurality of equally spaced frequency components in a second predetermined frequency band different from said first frequency band and a third signal having a predetermined single frequency different from the frequencies of said first and second frequency bands.

5. A transmission network as defined in claim 4 wherein said correction signal generating means includes at least first, second, third and fourth adjustable impedance elements for generating a controllably adjustable transfer function to substantially match an impedance developed when a bidirectional path including a loaded 2-wire cable is connected thereto, said first and second impedance elements adjust said transfer function in a predetermined midfrequency range, said third and fourth impedance elements adjust said transfer function in a predetermined high frequency range and said second impedance element is additionally employed to adjust said transfer function in a predetermined low frequency range.

6. Apparatus as defined in claim 5 wherein said first test signal is a pseudo-random noise signal having frequency components at 100 Hz spacing in a frequency band from 800 Hz to 2000 Hz, said second test signal is a pseudo-random noise signal having frequency components at 100 Hz spacing in a frequency band from 2200 Hz to 4000 Hz and said third test signal has a frequency of 350 Hz.

7. A transmission network as defined in claim 5 wherein said adjustment sequence includes first iteratively adjusting said first and second impedance elements with said first test signal supplied to the receive path until no changes in said impedance adjustments occur, second adjusting said network build out capacitor with said second test signal supplied to the receive path to obtain an amplitude null of a signal developed on the transmit path, third iteratively adjusting said first and second predetermined ones of said impedance elements with said first test signal supplied to the receive path until no changes in the impedance adjustments occur, fourth iteratively adjusting third and fourth impedance elements with said second test signal supplied to the receive path until no changes in the impedance adjustments occur, fifth iteratively repeat third and fourth until no changes in the impedance adjustments occur, sixth adjust said second impedance element with said third test signal supplied to the receive path to obtain an amplitude null of a signal developed on the transmit path, and seventh adjust said second impedance element to a value equal to one-half the sum of values of said second impedance element obtained in fifth and sixth.

8. A transmission network as defined in claim 1 wherein said control means further generates control signals for operating the network to determine whether the bidirectional facility connected to the network includes a specific type loaded 2-wire cable.

9. A transmission network as defined in claim 8 wherein said control signals operate said network to adjust a specific one of said correction signal generating means impedance elements from a first predetermined value to a second predetermined value, control said signal generating means to supply a fourth test signal having a predetermined frequency to the receive path, control said signal detection means to detect and store a first amplitude value of a signal developed on the transmit path in response to said fourth test signal with said specific impedance element adjusted to said second value, to adjust said specific impedance element to said first value, and compare a second amplitude value of said signal developed on the transmit path in response to said fourth test signal when said specific impedance is adjusted to said first value to said first amplitude value, wherein said 2-wire loaded cable is said specific type if said first amplitude value is less than said second amplitude value.

10. A transmission network as defined in claim 9 wherein said fourth test signal has a frequency of 4000 Hz.

11. A transmission network as defined in claim 1 further including means for supplying a fourth test signal having a predetermined frequency to said receive path, means for adjusting a specific one of said correction signal generating means impedance elements from a first value to a second value, and means for comparing amplitudes of signals developed on the transmit path when said specific impedance means is adjusted to said first value and said second value to determine whether the 2-wire loaded cable is said specific type.

* * * * *